United States Patent [19]

Voirol et al.

[11] Patent Number: 5,797,603
[45] Date of Patent: Aug. 25, 1998

[54] SEALING RING AND A METHOD OF MOUNTING IT

[75] Inventors: Bernard Voirol, Cormeilles en Parisis; Didier Cochin, Clamart; Thierry Travers, Chateau-Gontier, all of France

[73] Assignee: Le Joint Francais SNC, Paris, France

[21] Appl. No.: 630,453

[22] Filed: Apr. 10, 1996

[30] Foreign Application Priority Data

Apr. 13, 1995 [FR] France ................... 95 04445

[51] Int. Cl.$^6$ ....................................... F16L 5/02
[52] U.S. Cl. ............... 277/602; 277/314; 277/627; 277/644; 285/211; 285/349; 285/379; 285/344; 285/901; 285/918
[58] Field of Search .................. 285/344, 918, 285/910, 349, 211, 212, 220, 901, 379; 277/214, 105, 207 A, 466, 430, 377, 609, 626, 650, 602, 627, 644, 314

[56] References Cited

U.S. PATENT DOCUMENTS

| 451,008 | 4/1891 | Smith | 285/918 X |
|---|---|---|---|
| 1,825,962 | 10/1931 | Laird. | |
| 2,272,115 | 2/1942 | Halkyard | 285/918 X |
| 2,383,692 | 8/1945 | Smith | 285/344 X |
| 2,662,785 | 12/1953 | Fawick | 285/918 X |
| 3,257,719 | 6/1966 | Larkfeldt | 285/344 X |
| 3,746,348 | 7/1973 | Stone. | |
| 4,252,332 | 2/1981 | Nakayama et al. | 285/918 X |
| 5,161,806 | 11/1992 | Balsells | 285/918 X |

FOREIGN PATENT DOCUMENTS

| 0 579 448 | 1/1994 | European Pat. Off.. | |
|---|---|---|---|
| 2403497 | 5/1979 | France | 277/207 A |
| 2 685 050 | 6/1993 | France. | |
| 899580 | 12/1953 | Germany | 285/344 |
| 1475581 | 1/1969 | Germany | 277/207 A |
| 6708704 | 12/1967 | Netherlands | 285/344 |
| 928876 | 6/1963 | United Kingdom | 277/207 A |

Primary Examiner—Dave W. Arola
Attorney, Agent, or Firm—Oblon, Spivak, McClelland, Maier & Neustadt, P.C.

[57] ABSTRACT

The present invention relates mainly to a sealing ring and to a method of mounting it in a groove. According to the present invention, the sealing ring is twisted before being mounted in the groove so that the reaction forces retain it therein. The retention capabilities of the present invention is improved for sealing rings of a section that includes a projection directed towards a wall of the groove that provides radial support. The present invention applies more particularly to the mechanical, motor vehicle, and aircraft industries. The sealing ring of the present invention can be used, in particular, in association with the manifolds of turbocompressors, and with air inlet and outlet manifolds, in particular those made of plastics materials, as used in the motor vehicle industry.

10 Claims, 2 Drawing Sheets

SEALING RING AND A METHOD OF MOUNTING IT

The present invention relates mainly to a sealing ring and to a method of mounting it in a groove.

BACKGROUND OF THE INVENTION

Openings that open out through a surface of a part are commonly sealed by means of an O-ring received in a groove formed in the part and surrounding the opening, the O-ring co-operating with a cover or an element for passing fluid.

The generally rectangular axial section of such a groove is incapable of guaranteeing that the O-ring is held temporarily while waiting for the cover or fluid-passing element to be installed.

Various means have been proposed for holding the O-ring temporarily in the groove.

Grooves of trapezium-shaped section with an aperture that is smaller than the diameter of the O-ring serve to provide such temporary retention. Nevertheless, it is not possible to make such a groove by molding, and the difficulties of making such a groove by machining increase prices. It is not acceptable for a user to retain the sealing ring by means of adhesive, since the adhesive runs the risk of damaging the ring material, which is typically rubber, and of forming hard points that could compromise sealing. The use of adhesive also increases the cost of mounting a sealing ring.

Providing they can accept a considerable increase in the cost of mounting a sealing ring, manufacturers are capable of using adhesive to stick the sealing ring to the bottom of the groove.

Regularly distributed projections that reduce the width of the groove locally are difficult to make, and they suffer from the drawback of forming zones of necking in the sealing ring which are prejudicial to sealing being maintained in the long term.

SUMMARY OF THE INVENTION

Consequently, an object of the present invention is to provide temporary retention of a sealing ring in a groove while waiting for a cover or a fluid-passing element to be mounted.

Another object of the present invention is to provide good sealing when the cover or the fluid-passing element is mounted.

Another object of the present invention is to limit the cost of temporary retention of the sealing ring.

According to the present invention, these objects are achieved by twisting the sealing ring before mounting it in the groove, in such a manner that reaction forces hold it in place.

The retention provided by the present invention is improved in sealing rings of section that includes an extension directed towards a wall of the groove that provides radial support.

The invention mainly provides a sealing ring in the form of a body of revolution about an axis, wherein its axial section is defined on either side of the axis by a semicircle that is extended radially by a projection of length greater than the radius of the semicircle.

The invention also provides a sealing ring wherein the projection is a half-ellipse whose minor axis coincides with the diameter of the semicircle, the diameter and the length of the minor axis being equal.

The invention also provides a sealing ring, wherein the projection is directed radially towards the inside of the sealing ring.

The invention also provides a sealing ring wherein the projection is directed radially towards the outside of the sealing ring.

The invention also provides a sealing ring wherein it is made of an elastomer, in particular of rubber.

The invention also provides a part including an opening surrounded by a groove, wherein the groove is provided with a twisted sealing ring retained in the groove by the resilient return force couples of the sealing ring.

The invention also provides a part, wherein the sealing ring is twisted symmetrically in zones that are diametrically opposite.

The invention also provides a part, wherein the sealing ring is a sealing ring of the invention.

The invention also provides a method of installing a sealing ring in a groove, comprising the following steps:

a) twisting the sealing ring; and b) placing the sealing ring in the groove in such a manner that the resilient return couples of the sealing ring serve to retain it in the groove.

The invention also provides a method wherein the sealing ring is a sealing ring of the invention, and wherein two diametrically opposite zones of the sealing ring are twisted so as to direct the projection of the sealing ring towards the bottom of the groove.

BRIEF DESCRIPTION OF THE DRAWINGS

The invention will be better understood from the following description and the accompanying figures given as non-limiting examples and in which.

DESCRIPTION OF THE PREFERRED EMBODIMENTS

Figure 1:
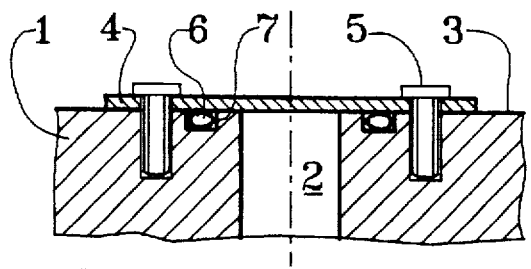
FIG. 1 is a longitudinal section view through a sealing ring of the present invention disposed between a part and a cover.

In FIG. 1, there can be seen a part 1 having an opening 2 that opens out in its outside surface 3, and that is closed by a cover 4 held by screws 5. A sealing ring 6 disposed in a groove 7 of rectangular section provides sealing between the cover 4 and the opening 2. In a variant that is not shown, the groove 7 is formed in the cover 4.

Figure 2:
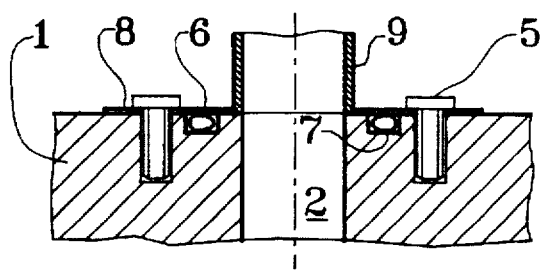
FIG. 2 is a longitudinal section view through a sealing ring of the present invention disposed between a part and an element for passing fluid.

In FIG. 2, there can be seen a flange 8 forming a fluid-passing element that is secured to a tubular duct 9 that is disposed to face the opening 2 in the part 1. The flange 8 is secured to the part 1 by means of screws 5, for example. A sealing ring 6 placed in a groove 7 formed in the outside face 3 of the part 1 and surrounding the opening 2 provides sealing for the assembly of the flange 8 on the part 1. The screws 5 impart axial compression to the sealing ring 6.

Naturally the groove 7 for receiving the sealing ring 6 can be provided in the fluid-passing element, in particular in the flange 8, without going beyond the ambit of the present invention.

Figure 3:
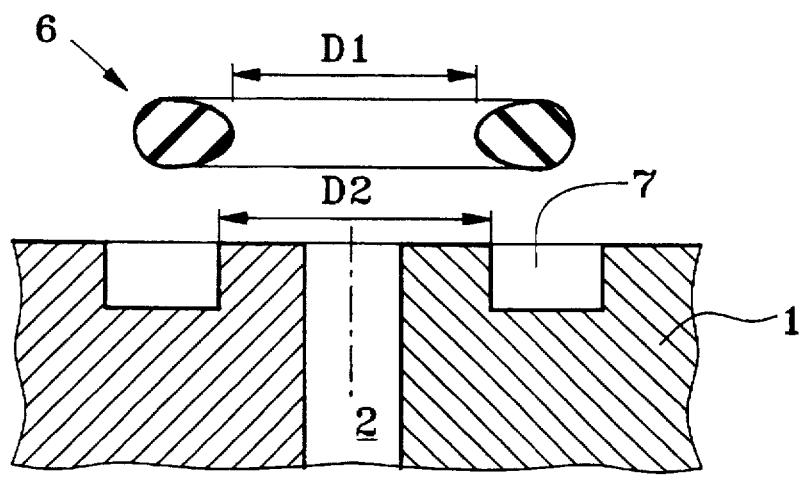
FIG. 3 is a longitudinal section view showing a sealing ring of the present invention that operates in radial extension in a groove.

In FIG. 3, there can be seen an advantageous embodiment of a sealing ring 6 of the present invention having an inside diameter D1 that is designed to be received in a groove 7 of rectangular section having an inside diameter D2 that is greater than D1.

Advantageously, the section of the sealing ring 6 is radially elongate towards the wall of the groove 7 that provides radial support. By way of example, the radially elongate section may be oval or it may include an optionally rounded point at its apex. Advantageously, the radial section of the sealing ring is defined by a semicircle whose diameter coincides with the minor axis of a half-ellipse, with the diameter of the semicircle being equal in length to the minor axis of the half-ellipse.

In the example shown in FIG. 3, where the sealing ring 6 is extended so as to be received in a circular groove of rectangular section, the half-ellipse is directed towards the inside and the diameter D1 of the sealing ring 6 is smaller than the diameter D2 of the inner radial wall of the groove 7. By contrast, in the embodiment shown in FIG. 4, the half-ellipse is directed towards the outside so that the outside diameter D3 of the sealing ring 6 is greater than the diameter D4 of the outer radial wall of the groove 7. Naturally, sealing rings 6 of different shape could be implemented, in particular rings having a radial projection of different shape, and an elliptical-section sealing ring or even an O-ring do not go beyond the ambit of the present invention. The radial projection of the sealing ring is of a length lying, for example, in the range 1.2 to 1.6 times the radius of the circular portion of the sealing ring. For example, for a sealing ring that is 2 mm thick, the radial projection of the sealing ring may be equal to 2.6 mm. The sealing ring 6 is made of resilient material, e.g. an elastomer and/or a plastomer. Advantageously, the hardness of the elastomer lies in the range of 55 to 90 on the Shore A scale, and preferably in the range 60 to 80, e.g. being equal to 70 or 80.

Figure 5:
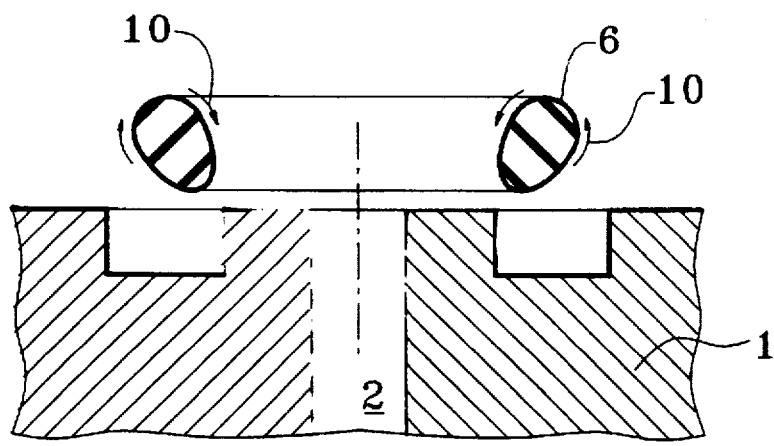
FIG. 5 is a diagrammatic view showing the deformation that is applied to a sealing ring of the present invention prior to installing it in a groove.
Figure 6:
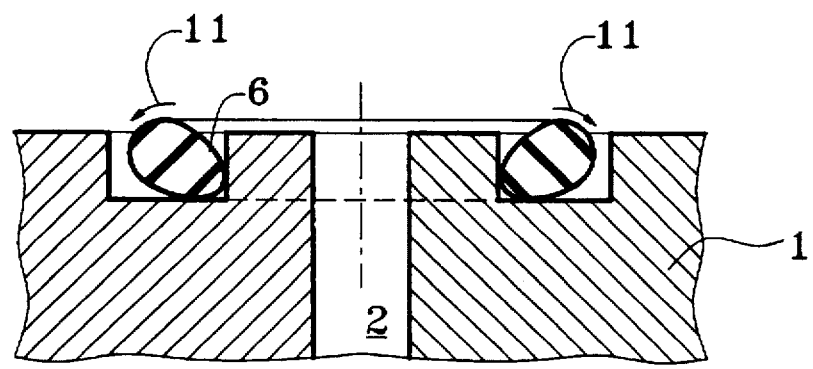
FIG. 6 is a longitudinal section showing the FIG. 5 sealing ring placed in the groove.

According to the present invention, and as shown in FIG. 5, the sealing ring 6 is twisted as shown by the arrows 10 so as to direct the projection of the sealing ring towards the bottom of the groove 7. Thus, when the sealing ring 6 is inserted into the groove 7, as shown in FIG. 6, two resilient force couples represented by arrows 11 urge the sealing ring 6 towards the bottom of the groove 7. The twist 10 imparted to the sealing ring 6 may lie in the range 15° to 90°, for example, preferably being in the range 20° to 60°, and being equal to 30° or 45°, for example.

Figure 7:
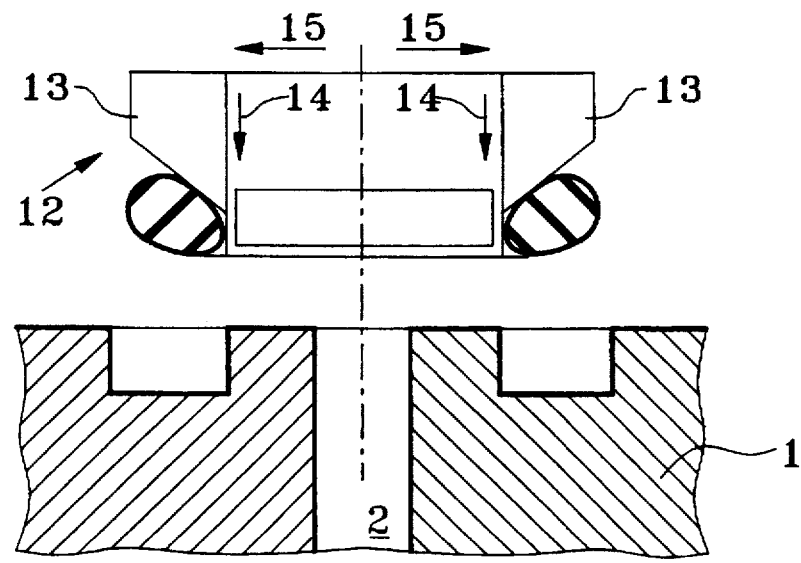
FIG. 7 is a longitudinal section view of a device for automatically installing the sealing ring of FIGS. 5 and 6.

In FIG. 7, there can be seen a machine 12 for placing sealing rings 6 of the present invention in grooves 7. The machine 12 has two diametrically opposite jaws 13 which move radially in the direction of arrows 15, thereby expanding the sealing ring 6 radially until its inside diameter is at least equal to D2, and which move axially in the direction of arrow 14, thereby enabling the sealing ring to be twisted in the direction of arrows 10 in FIG. 5.

Figure 4:
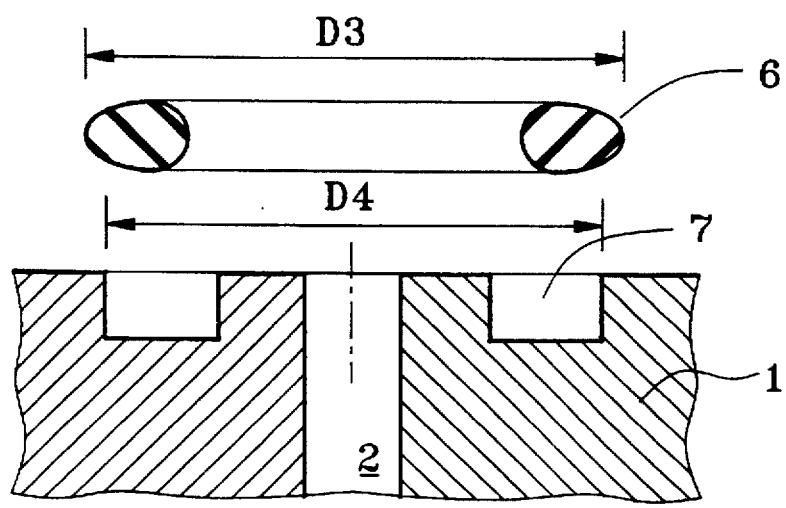
FIG. 4 is a longitudinal section view showing a sealing ring of the present invention that operates in radial compression in a groove.

An analogous machine (not shown) serves to install sealing rings as shown in FIG. 4.

The present invention applies to any industry that makes use of sealing rings, and in particular industries that presently make use of O-rings.

The present invention is particularly suitable for the mechanical, motor vehicle, and aircraft industries.

A sealing ring of the present invention can be used, in particular, in association with turbocompressor manifolds, and air inlet and outlet manifolds, particularly those made of plastic, as used in the motor vehicle industry.

We claim:

1. A sealing ring in the form of a body of revolution about an axis, wherein an axial section thereof is defined on either side of the axis by a semicircle that is extended radially by a projection in the form of a half-ellipse whose minor axis coincides with the diameter of the semicircle, its length being greater than the radius of the semicircle wherein said sealing ring is twisted symmetrically in zones of the ring that are diametrically opposite one another.

2. A sealing ring according to claim 1, wherein the diameter of the semicircle and the length of the minor axis of the half-ellipse are equal.

3. A sealing ring according to claim 1, wherein the projection is directed radially towards the inside of the sealing ring.

4. A sealing ring according to claim 1, wherein the projection is directed radially towards the outside of the sealing ring.

5. A sealing ring according to claim 1, wherein said body comprises rubber.

6. A part including an opening surrounded by a groove, wherein the groove is provided with a twisted sealing ring retained in the groove by the resilient return force couples of the sealing ring and wherein said sealing ring is twisted symmetrically in zones of the ring that are diametrically opposite one another.

7. A part according to claim 6, said sealing ring is in the form of a body of revolution about an axis, wherein an axial section thereof is defined on either side of the axis by a semicircle that is extended radially by a projection in the form of a half-ellipse whose minor axis coincides with the diameter of the semicircle, the length thereof being greater than the radius of the semicircle.

8. A part including an opening surrounded by a groove, wherein the groove is provided with a twisted sealing ring retained in the groove by the resilient return force couples of the sealing ring, and wherein the sealing ring comprises a sealing ring in the form of a body of revolution about an axis, wherein an axial section thereof is defined on either side of the axis by a semicircle that is extended radially by a projection in the form of a half-ellipse whose minor axis coincides with the diameter of the semicircle, the length thereof being greater than the radius of the semicircle and wherein said sealing ring is twisted symmetrically in zones of the ring that are diametrically opposite one another.

9. A method of installing a sealing ring in a groove, said sealing ring being in the form of the body of revolution of an axis, wherein an axial section thereof is defined on either side of the axis by a semicircle that is extended radially by a projection in the form of a half-ellipse whose minor axis coincides with the diameter of the semicircle, its length being greater than the radius of the semicircle, said method comprising the following steps:

a) symmetrically twisting the sealing ring in zones of the ring that are diametrically opposite one another; and b) placing the sealing ring in the groove in such a manner that the resilient return couples of the sealing ring serve to retain in the groove.

10. A method of installing a sealing ring in a groove, comprising the following steps:

a) symmetrically twisting the sealing ring in zones of the ring that are diametrically opposite one another; and b) placing the sealing ring in the groove in such a manner that the resilient return couples of the sealing ring serve to retain it in the groove, wherein the sealing ring in the form of a body of revolution about an axis, wherein an axial section thereof is defined on either side of the axis by a semicircle that is extended radially by a projection in the form of a half-ellipse whose minor axis coincides with a diameter of a semicircle, the length thereof being greater than the radius of the semicircle, and wherein two diametrically opposite zones of the sealing ring are twisted in such a manner as to direct the projection of the sealing ring towards the bottom of the groove.

* * * * *